United States Patent
Sato (10) Patent No.: US 6,611,290 B1
(45) Date of Patent: Aug. 26, 2003

(54) IMAGE SIGNAL CORRECTION DEVICE (75) Inventor: Koichi Sato, Saitama-ken (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/048,104

(22) Filed: Mar. 26, 1998

(30) Foreign Application Priority Data

Mar. 27, 1997 (JP) ............................................. 9-092958

(51) Int. Cl.[7] .......................... H04N 5/222; H04N 7/01; G09G 5/00; G09G 1/06
(52) U.S. Cl. .................. 348/333.01; 348/441; 348/445; 345/212; 345/10
(58) Field of Search ................................ 348/254, 256, 348/241, 242, 671, 674, 675, 604, 904, 333.01, 441, 445; 386/130; 345/10, 212; 382/154

(56) References Cited

U.S. PATENT DOCUMENTS

| | | | | |
|---|---|---|---|---|
| 4,764,814 A | * | 8/1988 | Endo et al. .................. | 348/213 |
| 5,260,794 A | * | 11/1993 | Sase et al. .................. | 348/254 |
| 5,294,990 A | | 3/1994 | Aoki .......................... | 348/363 |
| 5,546,101 A | * | 8/1996 | Sugawara .................... | 348/674 |
| 5,710,594 A | * | 1/1998 | Kim ........................... | 348/254 |
| 5,864,370 A | * | 1/1999 | Knox et al. .................. | 348/254 |
| 5,926,155 A | * | 7/1999 | Arai et al. .............. | 348/333.01 |
| 5,933,195 A | * | 8/1999 | Florencio ..................... | 348/416 |
| 5,933,199 A | * | 8/1999 | Yoon ........................... | 348/254 |
| 5,990,949 A | * | 11/1999 | Haruki ........................ | 348/254 |
| 6,084,978 A | * | 7/2000 | Taylor et al. ................ | 382/154 |
| 6,160,581 A | * | 12/2000 | Higashihara et al. ........ | 348/254 |
| 6,262,769 B1 | * | 7/2001 | Anderson et al. ........ | 348/333.1 |
| 6,335,760 B1 | * | 1/2002 | Sato ............................ | 348/397 |

FOREIGN PATENT DOCUMENTS

JP          08129553 A    *    5/1996

* cited by examiner

Primary Examiner—Wendy R. Garber
Assistant Examiner—Lin Ye
(74) Attorney, Agent, or Firm—Greenblum & Bernstein, P.L.C.

(57) ABSTRACT

An image signal correction device, provided in an electronic still camera, comprises a CPU, an image signal processing circuit, a gamma look-up table and a display in which a recognition information storing unit is provided. A clock pulse, outputted from the CPU, is received by the recognition information storing unit, so that a recognition pulse, corresponding to the gamma characteristics of the display, is outputted from the recognition information storing unit to the CPU, enabling gamma look-up data to be inputted to the gamma look-up table. The image signal, outputted from the image signal processing circuit, is subjected to a gamma correction in the gamma look-up table, and outputted to the display.

32 Claims, 6 Drawing Sheets

| Address | Value |
|---|---|
| $A_1$ | $(N)$ |
| $A_2$ | $(\alpha_1)$ |
| $A_3$ | $(\gamma_1)$ |
| $A_4$ | $(\alpha_2)$ |
| $A_5$ | $(\gamma_2)$ |
| ⋮ | ⋮ |
| $A_{2N-2}$ | $(\alpha_{N-1})$ |
| $A_{2N-1}$ | $(\gamma_{N-1})$ |
| $A_{2N}$ | $(\alpha_N)$ |
| $A_{2N+1}$ | $(\gamma_N)$ |

FIG. 7

IMAGE SIGNAL CORRECTION DEVICE

BACKGROUND OF THE INVENTION

1. Field of the Invention

The present invention relates to an image signal correction device, by which an image signal, outputted by a CCD, for example, is corrected or adjusted in accordance with the indication characteristics of a display for indicating the image.

2. Description of the Related Art

An image signal, produced by a CCD of an electronic still camera, is subjected to various image processes, thus enabling an image corresponding to the image signal to be indicated on a display connected to the electronic still camera. The display may be a CRT, a liquid crystal display (LCD), a plasma display panel (PDP), a field-emission display (FED) or an electroluminescence (EL) display, each of which has an inherent contrast characteristic or gamma characteristic.

The contrast characteristic is the degree of black and white or light and shade which is indicated by the display. The gamma characteristic is defined as a non-linear relationship between the output signal and the input signal of the display.

SUMMARY OF THE INVENTION

Therefore, an object of the invention is to provide an image correction device by which an appropriate correction, such as a gamma correction, corresponding to a connected display, is performed on an image signal.

According to the present invention, there is provided an image signal correction device by which indication characteristics of a display negligibly affect an image, which is indicated by the display, the device comprising a recognition information storing unit and a correction processor.

In the recognition information storing unit, recognition information corresponding to the indication characteristics is stored. The correction processor is provided for making a correction to the image signal in accordance with the indication characteristics, based on the recognition information, whereby a corrected image signal is outputted to the display.

Further, according to the present invention, there is provided an image signal correction device comprising an image signal processing circuit, a display, a recognition information storing unit and a correction processor.

The image signal processing circuit outputs an image signal in accordance with an image obtained by an imaging device. The display, incorporating indication characteristics, is provided for indicating the image. In the recognition information storing unit, recognition information corresponding to the indication characteristics is stored. The correction processor is provided for making a correction to the image signal in accordance with the indication characteristics, based on the recognition information, whereby a corrected image signal is outputted to the display to indicate the image.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

The present invention will be described below with reference to embodiments shown in the drawings.

Figure 1:
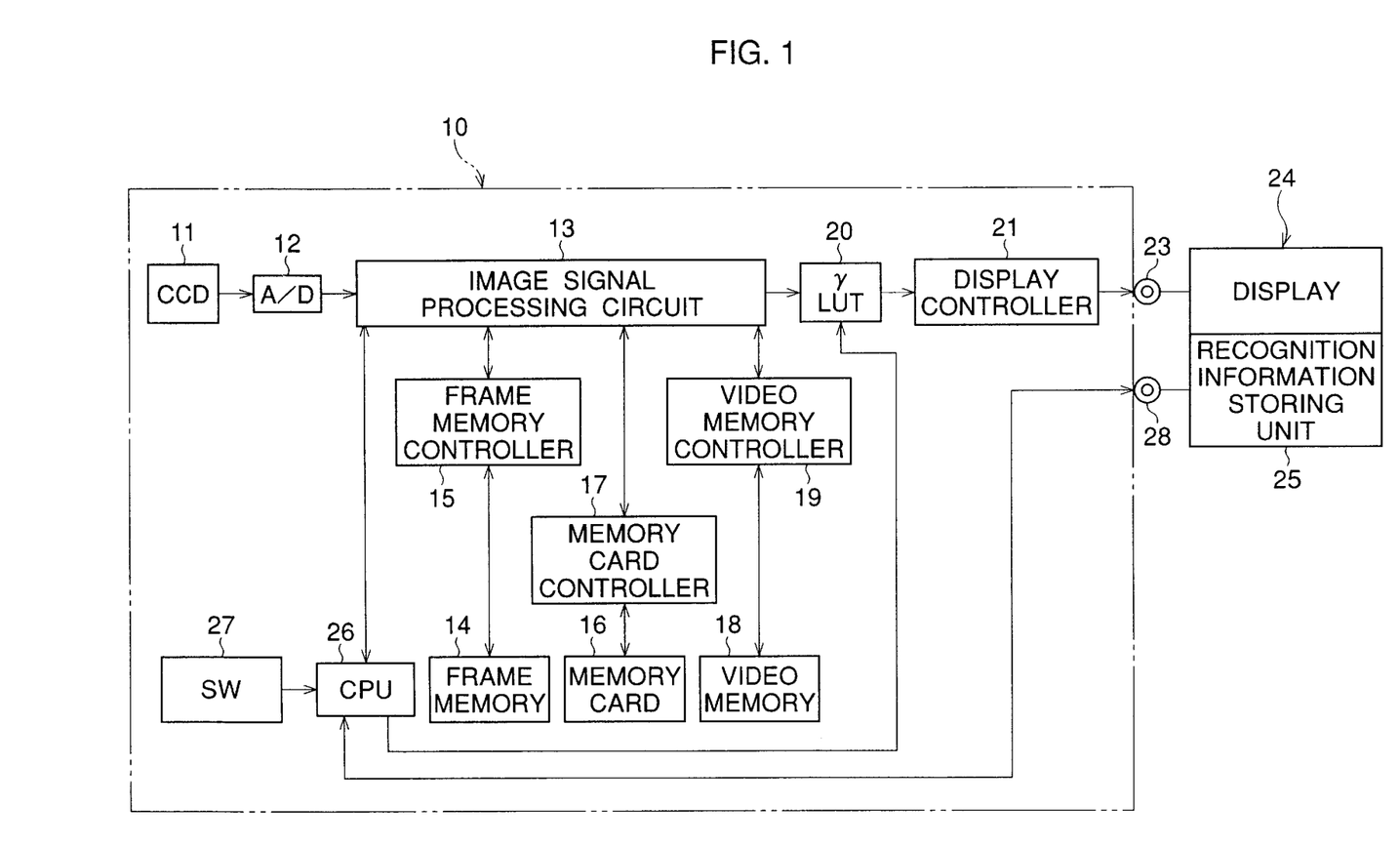
FIG. 1 is a block diagram showing an electronic still camera having an image reproduction device to which a first embodiment of the present invention is applied.

FIG. 1 shows a block diagram of an electronic still camera system to which a first embodiment of the present invention is applied.

In an electronic still camera 10, an optical image obtained by a photographing optical system (not shown) is formed on a light receiving surface of an imaging device or CCD (charge coupled device) 11, so that the optical image is photoelectrically-converted to an electric charge signal by the CCD 11. The electric charge signal, which is an analog image signal, having been outputted from the CCD 11, is converted by an A/D converter 12 to a digital image signal.

An image signal processing circuit 13 is provided for subjecting the digital image signal to various kinds of image processing. A frame memory 14, provided for storing the digital image signal, is connected to a frame memory controller 15, which is connected to the image signal processing circuit 13. The digital image signal outputted from the A/D converter 12 is temporarily stored in the frame memory 14, through the frame memory controller 15, and is subsequently read from the frame memory 14, to be compressed by the image signal processing circuit 13.

A memory card 16 is provided for storing the compressed image signal as image data. The memory card 16 is connected to a memory card controller 17, which is connected to the image signal processing circuit 13. The image data are processed by the memory card controller 17, so that the image data are converted to a predetermined format for the memory card 16. Note that the memory card 16 can be detached from the electronic still camera 10.

The image data stored in the memory card 16 are read therefrom, through the memory card controller 17, and are expanded by the image signal processing circuit 13. The expanded image data are stored in the frame memory 14. Then, the expanded image data are read from the frame memory 14, so that an image signal for monitoring is generated by the image signal processing circuit 13, in accordance with the expanded image data. The image signal for monitoring is stored in a video memory 18.

The video memory 18 is connected to a video memory controller 19, which is connected to the image signal processing circuit 13. Thus, the image signal is stored in and read from the video memory 18, and inputted into a gamma look-up table 20, in which gamma corrected image data are prestored in addresses corresponding to the pixel values of the image signal outputted by the image signal processing circuit 13. Namely, the corrected image data of a pixel value of the image signal can be read by accessing the address corresponding to the pixel value.

The gamma look-up table 20 is a memory in which a writing operation and a deleting operation can be electronically carried out. Namely, the corrected image data, i.e. the gamma look-up data, can be rewritten by a CPU 26 in accordance with recognition information, as described later.

The corrected image data read from the gamma look-up table 20, are inputted into a display controller 21, in which a synchronization signal is added to the corrected image data, so that a video image signal is generated. The video image signal is then inputted into a display 24, through an input terminal 23 provided in the display 24.

The display 24 includes a recognition information storing unit 25, which outputs recognition information corresponding to the gamma characteristics, i.e. the indication characteristics of the display 24, so that the gamma characteristics can be determined by the CPU 26. The gamma characteristics, and thus the recognition information, vary in accordance with the interchangeable display 24.

An operation of the electronic still camera 10 is controlled by a microcomputer (CPU) 26. A switch 27 controls the CPU 26. The image signal processing circuit 13 is operated in accordance with a command signal outputted by the CPU 26, and information regarding the image signal is transferred between the image signal processing circuit 13 and the CPU 26. The CPU 26 is connected to the gamma look-up table 20 and the recognition information storing unit 25 via an input-output terminal 28 provided in the display 24, enabling information regarding the gamma characteristics of the display 24 to be transferred between the CPU 26 and the recognition information storing unit 25.

Figure 2:
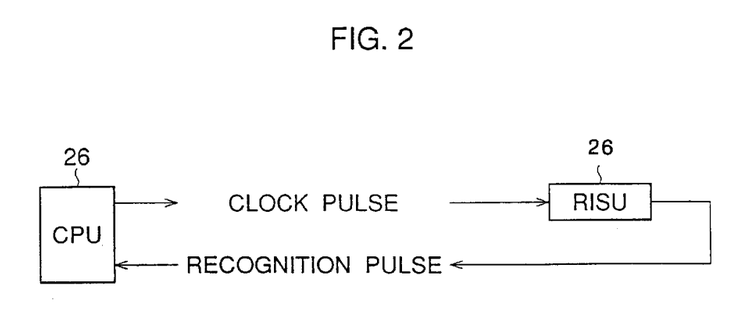
FIG. 2 is a view showing an operation of a CPU and a resolution recognition unit.

With reference to FIG. 2, an operation of the recognition information storing unit 25 is described below.

The recognition information storing unit 25 comprises a counter, to which clock pulses are inputted from the CPU 26. Every time a predetermined number of clock pulses is received by the recognition information storing unit 25, which performs a counting routine, a recognition pulse is outputted therefrom. The predetermined number of clock pulses is referred to as a count number hereinafter, being set in accordance with the gamma characteristics of the display 24 (see FIG. 1).

Figure 3:
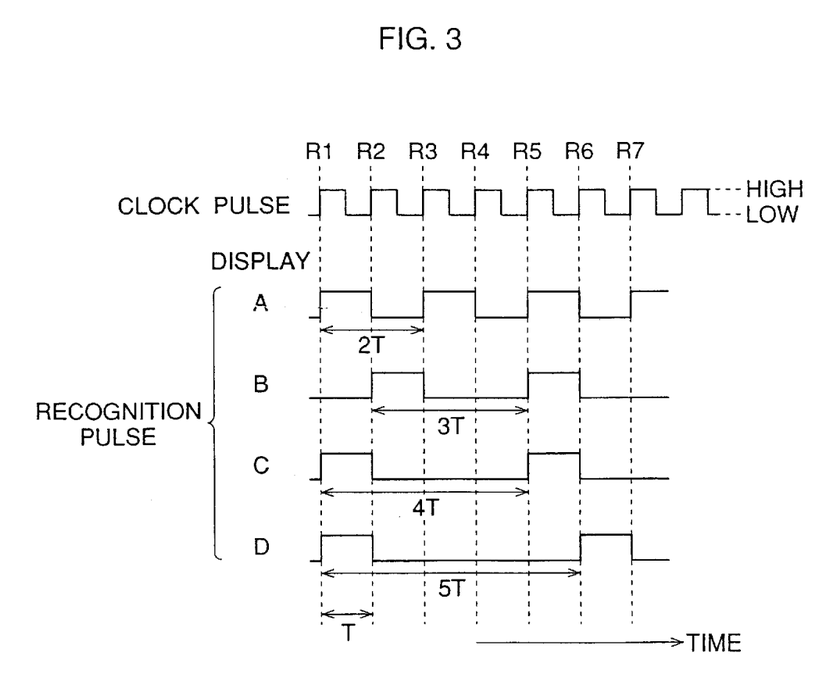
FIG. 3 is a timing chart showing clock pulses and recognition pulses.

FIG. 3 is a timing chart, showing the clock pulse, the recognition pulse, and time, which elapses from left to right. The clock pulse is continuously changed between a high level and a low level with a constant period. The recognition information storing unit 25 is operated in accordance with a rise of the clock pulse, i.e. when the clock pulse becomes high. The rise is indicated by references R1, R2 . . . R7, in FIG. 3. Note that a period from a rise of the clock pulse to a next rise of the clock pulse is defined as the pulse spacing, T.

The count number is set in such a manner that the recognition pulse has a pulse spacing of 2T when the gamma characteristics of the display 24 are of a type A, i.e. when the gamma look-up data $\gamma_A$ should be stored in the gamma look-up table 20.

When the gamma characteristics of the display 24 is of a type B, i.e. when the gamma look-up data $\gamma_B$ should be stored, the period of the recognition pulse is 3T. When the gamma characteristics of the display 24 are of a type C, i.e. when the gamma look-up data $\gamma_C$ should be stored, the period of the recognition pulse is 4T. When the gamma characteristics of the display 24 are of a type D, i.e. when the gamma look-up data $\gamma_D$ should be stored, the period of the recognition pulse is 5T.

Thus, on input of the clock pulse, the recognition information storing unit 25 outputs the recognition pulse, which has a predetermined period corresponding to the gamma characteristics of the display 24. The recognition pulse is inputted into the CPU 26, enabling the gamma characteristics of the attached display 24, to be recognized. Therefore, a reproduction of the image can be performed by the image signal processing circuit 13 (see FIG. 1), in accordance with the gamma characteristics of the display 24.

Figure 4:
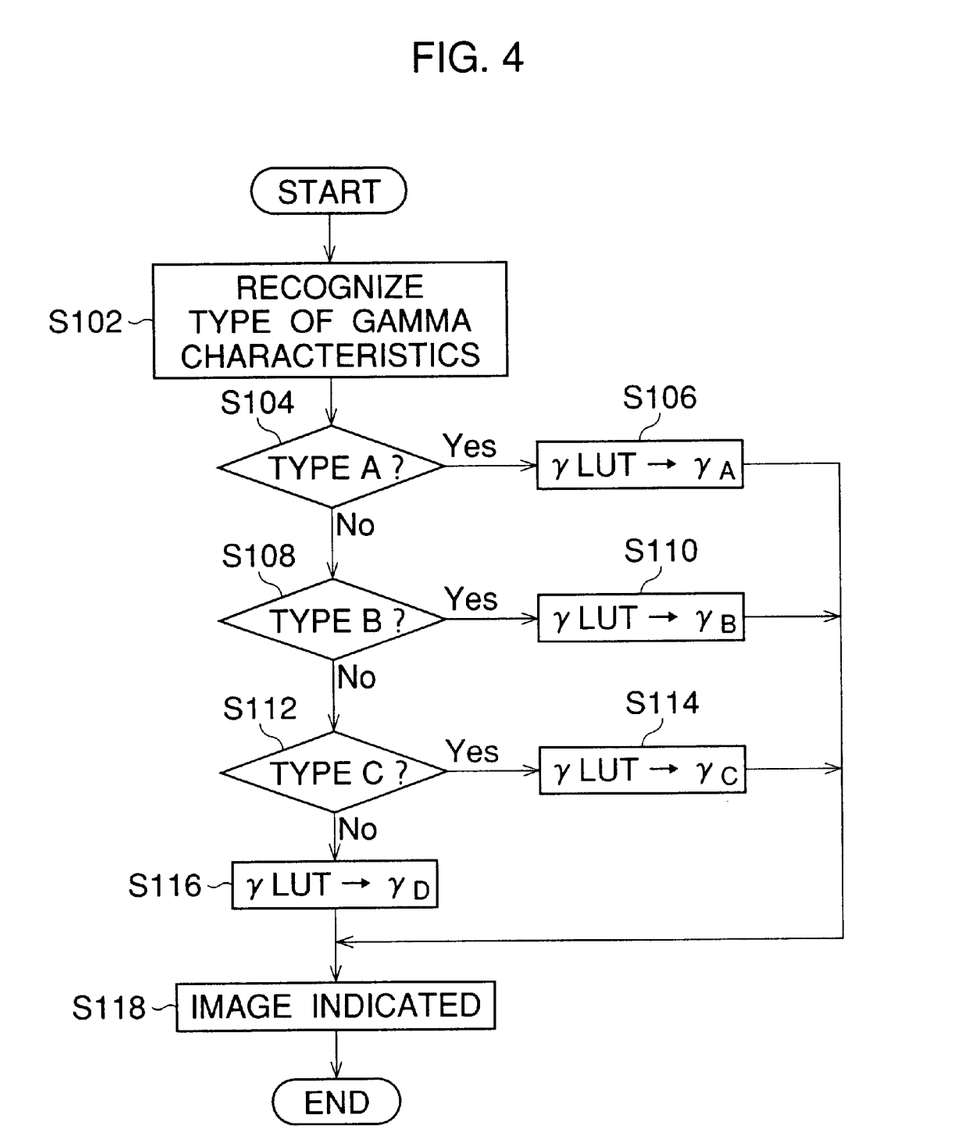
FIG. 4 is a flow chart of a gamma correction process performed in the first embodiment.

FIG. 4 shows a flow chart of a gamma correction process by which an image is subjected to a gamma correction in accordance with the gamma characteristics of the display 24.

In Step S102, the clock pulses are outputted from the CPU 26 and inputted to the recognition information storing unit 25, in which the gamma characteristics of the display 24 are determined, based on the recognition pulse outputted by the recognition information storing unit 25. For example, when the recognition pulse has a pulse spacing of 4T, it is judged that the display 24 has gamma characteristics is of type C. Note that the look-up data $\gamma_A$, $\gamma_B$, $\gamma_C$, $\gamma_D$, corresponding to the gamma characteristics of types A, B, C and D, are stored in a memory provided in the CPU 26.

In Step S104, it is determined whether the gamma characteristics recognized by the CPU 26 are of type A. When the gamma characateristics are of type A, Step S106 is executed in which the gamma look-up data $\gamma_A$ are set and outputted to the gamma look-up table 20, and the process goes to Step S118.

Conversely, when it is determined in Step S104 that the gamma characteristics are not of type A, Step S108 is executed. It is determined in Step S108 whether the gamma charatceristics are of type B. When the gamma charatceristics are of type B, the gamma look-up data $\Gamma_B$ are set in Step S110. Then, Step S118 follows.

When it is determined in Step S108 that the gamma characteristics are not of type B, the process goes to Step S112, in which it is determined whether the gamma characteristics are of type C. When the gamma characteristics are of type C, the gamma look-up data $\gamma_C$ are set in Step S114. Then, the process goes to Step S118.

On the other hand, when it is determined in Step S112 that the gamma characteristics are not of type C, the characteristics should be of type D. Therefore, the gamma look-up data $\gamma_D$ are set in Step S116, and Step S118 is then executed.

In Step S118, an image is indicated on the display 24. Namely, the compressed image signal, stored in the memory card 16 as image data, is expanded to produce expanded image data, corresponding to the pixel values of the original image signal. The expanded image data are stored in the frame memory 14, are read from the frame memory 14, so that an image signal for monitoring is generated by the image signal processing circuit 13, and are stored in the video memory 18. The image signal is read from the video memory 18, and inputted into the gamma look-up table 20, so that gamma corrected image data are outputted to the display controller 21, which, in turn outputs a gamma corrected image signal to the display 24. Thus, an image is indicated on the display 24, and the process ends.

As described above, in the first embodiment, since the recognition information storing unit 25 outputs a recognition pulse, indicating the gamma characteristics of the display 24, in response to a clock pulse outputted by the CPU 26, the gamma characteristics can be easily recognized by the CPU 26. Therefore, the CPU 26 is able to set the appropriate gamma look-up data, corresponding to the display 24, in the gamma look-up table 20, and thus, an image, which is correctly adjusted, is indicated on the display 24.

Figure 5:
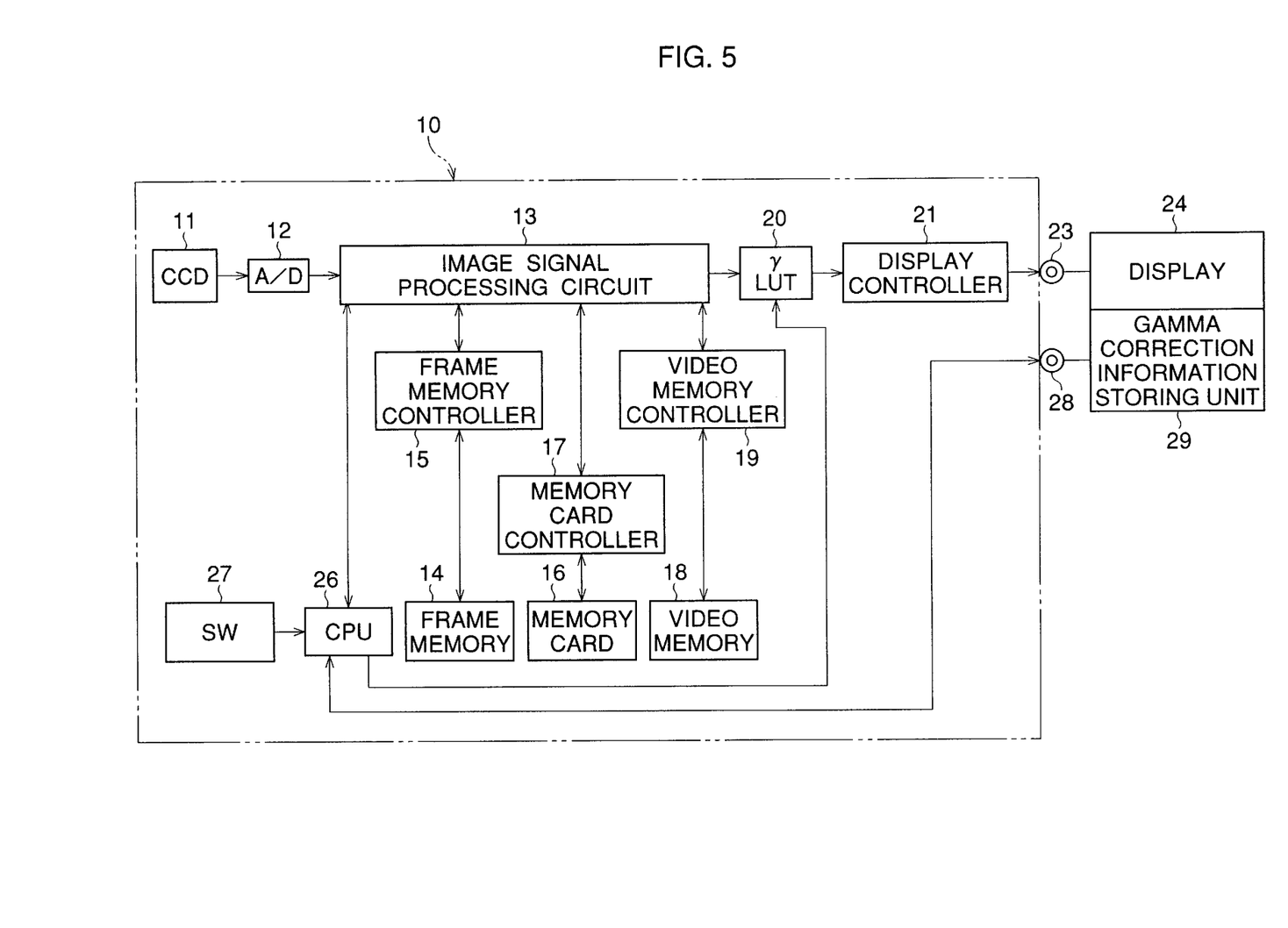
FIG. 5 is a block diagram showing an electronic still camera having an image reproduction device to which a second embodiment of the present invention is applied.

FIG. 5 shows a block diagram of an electronic still camera system to which a second embodiment of the present invention is applied.

In the second embodiment, the recognition information storing unit 25 in the first embodiment is replaced with a gamma correction information storing unit 29. The other components are the same as those of the first embodiment. Therefore, in FIG. 5, the corresponding components are indicated by the same numerical references as those of the first embodiment.

The gamma correction information storing unit 29 is provided in a display 24. The gamma correction information storing unit 29 is a read only memory, for example, in which gamma correction information inherent to the display 24 is stored. The CPU 26 is connected to the gamma correction information storing unit 29, through the input-output terminal 28, so that the gamma correction information is read from the gamma correction information storing unit 29, and inputted into the CPU 26. The CPU 26 thus generates the gamma look-up data, which are then transmitted to the gamma look-up table 20.

Figure 6:
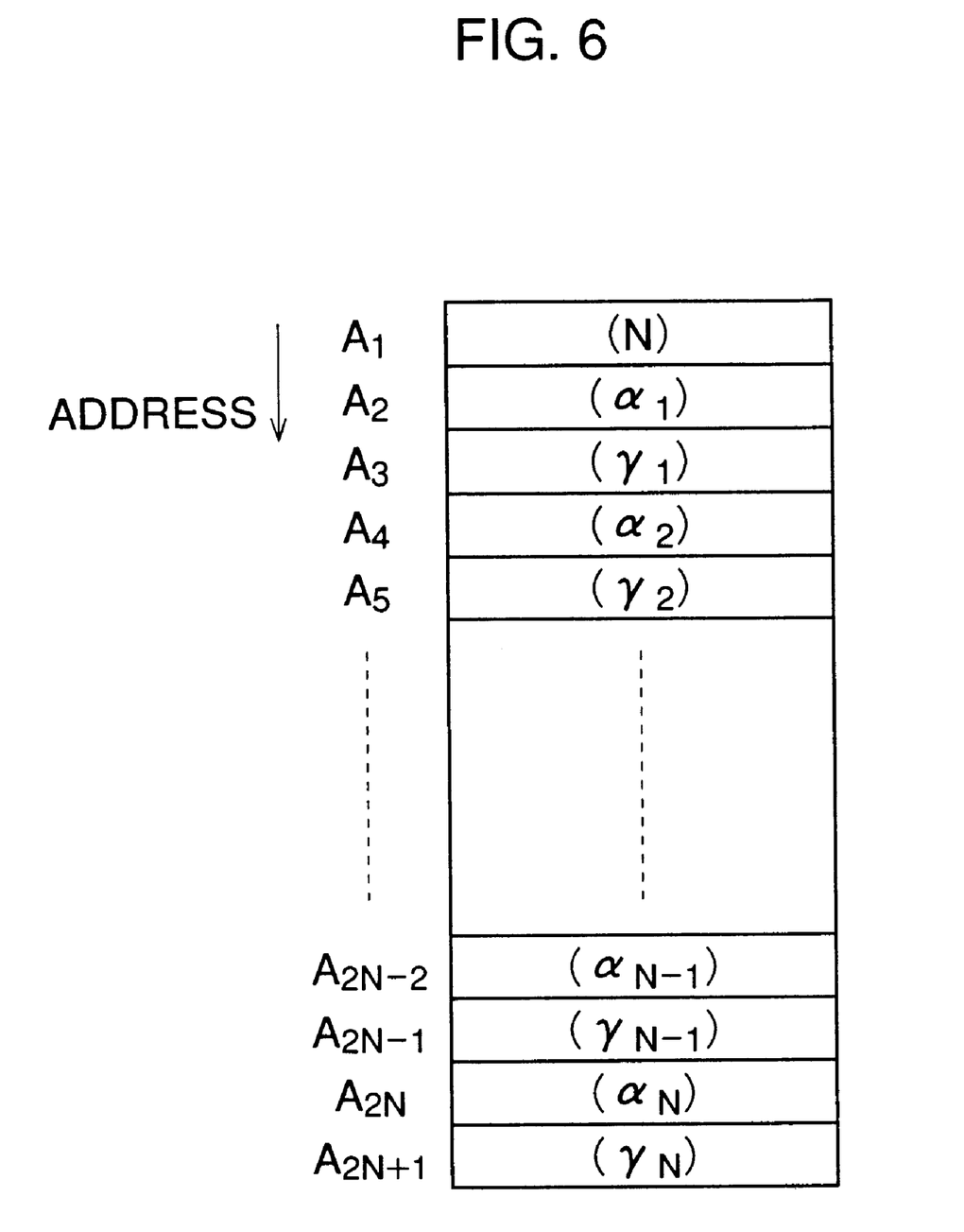
FIG. 6 is a view showing a construction of a gamma correction information storing unit.

FIG. 6 shows a construction of the gamma correction information storing unit 29. The gamma correction information is composed of parameters by which a function, indicated by formula (1), is defined. In addresses $A_1$, $A_2$, ... $A_{2N}$, $A_{2N+1}$, parameters "N", "$\alpha_1$", "$\gamma_1$", "$\alpha_2$", "$\gamma_2$", ... "$\alpha_{N-1}$", "$\gamma_{N-1}$", "$\alpha_N$" and "$\gamma_N$" are stored, respectively. The parameter "N" is a gamma correction order or degree by which the gamma correction is performed. The parameters "$\alpha_1$", "$\alpha_2$", ... "$\alpha_{N-1}$" and "$\alpha_N$" are coefficeints, and the parameters "$\gamma_1$", "$\gamma_2$", ... "$\gamma_{N-1}$" and "$\gamma_N$" are powers. Namely, the gamma correction order "N" is stored in the address $A_1$, the coefficient "$\alpha_K$", K being a positive integer, is stored in the address $A_{2K}$, and the power "$\gamma_K$" is stored in the address $A_{2K+1}$.

$$y = \alpha_1 \times X^{\gamma_1} + \alpha_2 \times X^{\gamma_2} \ldots + \alpha_N \times X^{\gamma_N} \qquad (1)$$

Note that, in formula (1), "x" indicates an address of the gamma look-up table, the address corresponding to an inputted pixel value of the image signal, and "y" indicates a value of the corrected image data to be outputted. Each of the parameters is determined in accordance with the gamma characteristics of the display 24.

Figure 7:
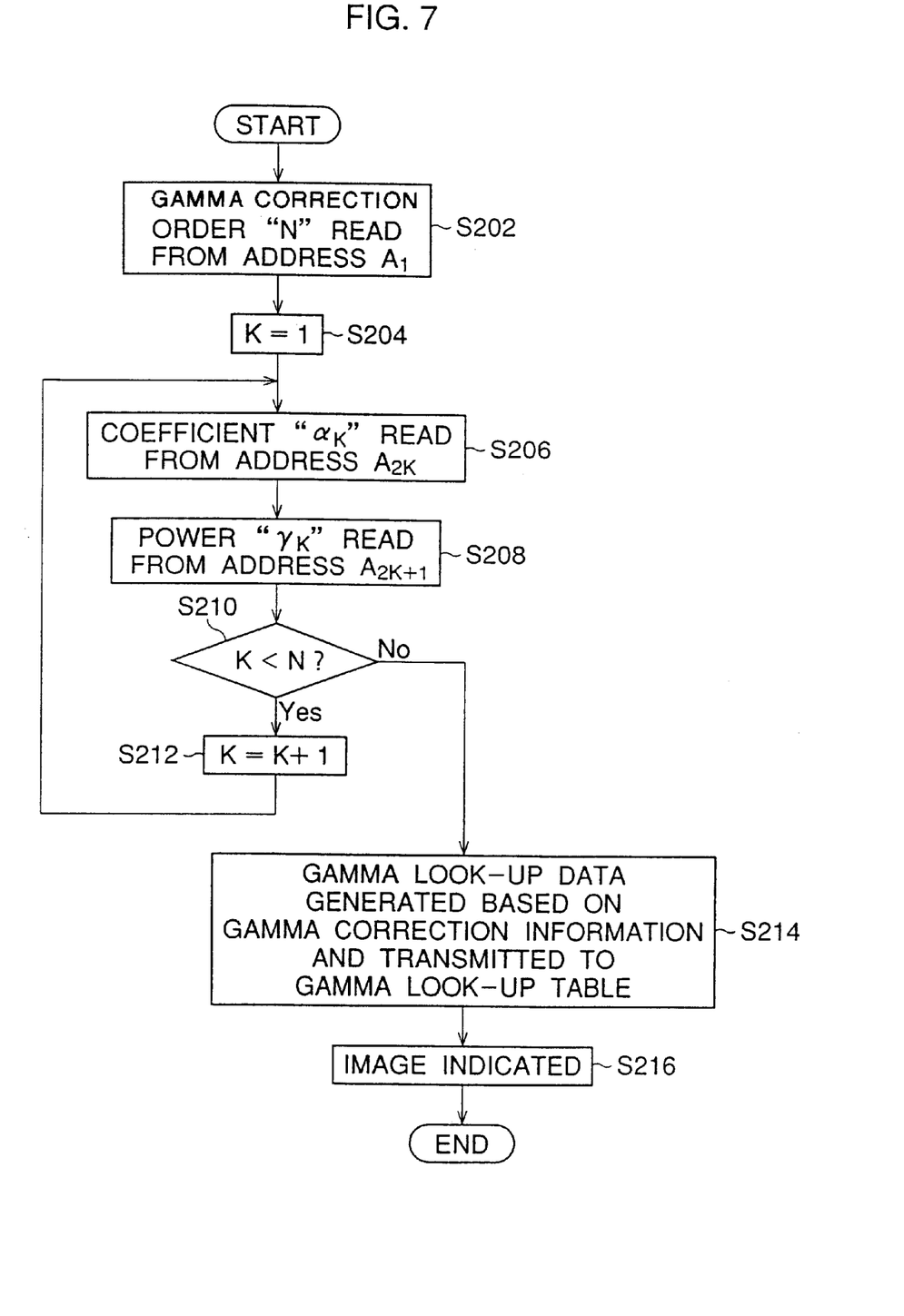
FIG. 7 is a part of a flow chart of a gamma correction process performed in the second embodiment.

FIG. 7 shows a flow chart of a gamma correction process executed in the second embodiment.

In Step S202, the gamma correction order N is read from the address $A_1$. In Step S204, the initial value of the parameter K is set to 1. Then, the coefficient $\alpha_K$ is read from the address $A_{2K}$ in Step S206, and the power $\gamma_K$ is read from the address $A_{2K+1}$ in Step S208. It is determined in Step S210 whether or not the parameter K is less than N. If the parameter K is less than N, Step S212 is executed in which K is incremented by 1, and Step S206 is again executed. Namely, in Steps S204 through S212, the gamma correction information, which includes the gamma correction order N, the coefficient $\alpha_K$ and the power $\gamma$ (K=1, 2, ... N), is read from the gamma correction information storing unit 29.

When it is determined, in Step S210, that the parameter K is greater than or equal to N, Step S214 is executed in which the gamma look-up data are generated based on the gamma correction order N, the coefficient $\alpha_K$ and the power $\gamma_K$ (K=1, 2, ... N), using formula (1), and transmitted to the gamma look-up table 20. The pixel values of an image signal are subjected to the gamma correction, based on the gamma look-up data in the gamma look-up table 20, and an image is indicated on the display 24 in Step S216.

Similar to the first embodiment, according to the second embodiment, since the gamma correction information storing unit 29 outputs data, corresponding to the gamma characteristics of the display 24, in response to a clock pulse outputted by the CPU 26, the gamma characteristics can be easily determined by the CPU 26. Therefore, a high quality image can be indicated on the display 24. Further, according to the second embodiment, a gamma correction, which conforms to various types of display device, can be carried out without prerecording the gamma correction information in the electronic still camera 10 prior to attaching of the display 24.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 9-92958 (filed on Mar. 27, 1997) which is expressly incorporated herein, by reference, in its entirety.

What is claimed is:

1. An image signal correction device by which indication characteristics of a display negligibly affect an image, which is indicated by said display, said device comprising:
   a recognition information storage in which recognition information indicating a type of display is stored, said recognition information storage being provided in said display; and
   a correction processor that receives a recognition signal corresponding to said recognition information to recognize said indication characteristics, so that said correction processor makes a correction to said image signal in accordance with said indication characteristics, based on said recognition information, whereby a corrected image signal is outputted to said display, said correction processor being provided in an electronic device to which said display is connected.

2. An image signal correction device according to claim 1, wherein said electronic device is an electronic still camera.

3. An image signal correction device according to claim 1, further comprising a clock pulse generator that outputs a clock pulse of a constant period, said recognition information storage outputting said recognition signal in association with said clock pulse.

4. An image signal correction device according to claim 1, wherein said correction processor comprises a look-up table in which look-up data corresponding to said indication characteristics are stored, said look-up data being overwritable by said correction processor in accordance with said recognition information.

5. An image signal correction device according to claim 1, wherein said indication characteristics includes a gamma characteristic, and said correction processor makes a gamma correction to said image signal in accordance with said gamma characteristic.

6. The image signal correction device according to claim 1, said recognition information storage outputting a recognition pulse, spacing of said recognition pulse indicating a display type.

7. An image signal processing system comprising:
   a display that has a recognition information storage in which recognition information indicating a type of said display is stored; and
   an image signal corrector that has correcting information, selected in accordance with said recognition information, to perform an image correction corresponding to said recognition information, said image signal corrector being provided in an electronic device to which said display is connected.

8. The image signal correction device according to claim 7, wherein said electronic device is an electronic still camera.

9. The image signal correction device according to claim 7, wherein said recognition information storage outputs a recognition signal corresponding to said recognition information, so that said image signal corrector can recognize said recognition information.

10. The image signal correction device according to claim 9, further comprising a clock pulse generator that outputs a clock pulse of a constant period, said recognition information storage outputting said recognition signal in association with said clock pulse.

11. The image signal correction device according to claim 7, wherein said image signal correction device comprises a look-up table in which look-up data corresponding to said recognition information is stored, said look-up data being overwritable by said image signal corrector in accordance with said recognition information.

12. The image signal correction device according to claim 7, wherein said image signal corrector makes a gamma correction to an image signal in accordance with said recognition information.

13. The image signal correction device according to claim 7, said recognition information storage outputting a recognition pulse, spacing of said recognition pulse indicating a display type.

14. An image signal correction device connected to a display that has a recognition information storage, in which recognition information, corresponding to indication characteristics of the display is stored, said image signal correction device comprising:

a memory that stores correcting information, which is selected in accordance with said recognition information, that indicates a type of display so that an image correction corresponding to said indication characteristics is performed.

15. The image signal correction device according to claim 14, wherein said memory is provided in an electronic still camera.

16. The image signal correction device according to claim 14, wherein the recognition information storage outputs a recognition signal corresponding to the recognition information, so that the image signal correction device can recognize said indication characteristics.

17. The image signal correction device according to claim 16, further comprising a clock pulse generator that outputs a clock pulse of a constant period, the recognition information storage outputting said recognition signal in association with said clock pulse.

18. The image signal correction device according to claim 14, wherein said memory comprises a look-up table in which look-up data corresponding to said indication characteristics are stored, said look-up data being overwritable by said image signal correction device in accordance with said recognition information.

19. The image signal correction device according to claim 14, wherein said indication characteristics includes a gamma characteristic, and said image signal correction device makes a gamma correction to said image signal in accordance with said gamma characteristic.

20. The image signal correction device according to claim 14, said recognition information storage outputting a recognition pulse, spacing of said recognition pulse indicating a display type.

21. An image signal correction device by which indication characteristics of a display negligibly affect an image, which is indicated by said display, said device comprising:

a correction information storage in which correction information corresponding to indication characteristics of the display is stored, said correction information storage being provided in the display; and a correction processor that receives said correction information to generate a correction table based on said correction information, so that an image signal is subjected to an image correction in accordance with said correction table, whereby a corrected image signal is outputted to the display, said correction processor being provided in an electronic device to which the display is connected.

22. An image signal correction device according to claim 21, wherein said electronic device is an electronic still camera.

23. An image signal correction device according to claim 21, wherein said image correction comprises a gamma correction.

24. The image signal correction device according to claim 21, said correction processor determining a type of display based upon said correction information, and adjusting an image on the display in accordance with the determined type of display.

25. An image signal processing system comprising:

a display that has a correction information storage in which correction information corresponding to indication characteristics of said display is stored; and an image signal corrector that performs an image correction in accordance with correction information, said image signal corrector being provided in an electronic device to which said display is connected.

26. An image signal correction device according to claim 25, wherein said electronic device is an electronic still camera.

27. An image signal correction device according to claim 25, wherein said image correction comprises a gamma correction.

28. The image signal correction device according to claim 25, said image signal corrector determining a type of display based upon said correction information and adjusting an image on the display in accordance with the determined type of display.

29. An image signal correction device connected to a display that has a correction information storage, in which correction information corresponding to indication characteristics of the display is stored, said image signal correction device comprising:

a memory that stores a correction table that is generated in accordance with said correction information, an image correction corresponding to said indication characteristics being performed in accordance with said correction table.

30. An image signal correction device according to claim 29, wherein said memory is provided in an electronic still camera.

31. The image signal correction device according to claim 29, wherein said image correction comprises a gamma correction.

32. The image signal correction device according to claim 29, said device further determining a type of display based upon said correction information and adjusting an image on the display in accordance with the determined type of display.

* * * * *